United States Patent [19]
Prouty et al.

[11] Patent Number: 5,755,817
[45] Date of Patent: May 26, 1998

[54] HYDROSTATIC SEAL

[75] Inventors: Warren Conrad Prouty; John Clark Bond, both of Arvada, Colo.

[73] Assignee: Sundstrand Corporation, Rockford, Ill.

[21] Appl. No.: 771,878

[22] Filed: Dec. 23, 1996

Related U.S. Application Data

[63] Continuation of Ser. No. 383,630, Feb. 6, 1995, abandoned.

[51] Int. Cl.⁶ .................................................. F04D 29/12
[52] U.S. Cl. ...................... 415/112; 415/111; 415/113; 415/176; 277/74; 277/75; 277/96.1
[58] Field of Search ........................... 415/111, 112, 415/113, 176, 230, 231; 277/74, 75, 96.1

[56] References Cited

U.S. PATENT DOCUMENTS

| | | | |
|---|---|---|---|
| Re. 34,319 | 7/1993 | Boutin et al. | 277/96.1 |
| 3,093,382 | 6/1963 | Macks | 277/74 |
| 3,155,393 | 11/1964 | Hummer | 277/74 |
| 3,606,349 | 9/1971 | Petrie et al. | |
| 3,638,957 | 2/1972 | Marsi | 277/96.1 |
| 3,640,541 | 2/1972 | Taschenberg | |
| 3,895,813 | 7/1975 | Davies et al. | |
| 3,957,276 | 5/1976 | Wiese | |
| 4,114,900 | 9/1978 | Wiese | 277/74 |
| 4,275,891 | 6/1981 | Boes | |
| 4,323,255 | 4/1982 | Wiese | |
| 4,406,466 | 9/1983 | Geary | |
| 4,643,437 | 2/1987 | Salant et al. | |
| 4,934,254 | 6/1990 | Clark et al. | |
| 5,052,694 | 10/1991 | Lipschitz | |
| 5,193,974 | 3/1993 | Hufford | 415/112 |
| 5,195,867 | 3/1993 | Stirling | 415/111 |

FOREIGN PATENT DOCUMENTS 1541451  2/1990  U.S.S.R. .

*Primary Examiner*—Christopher Verdier
*Attorney, Agent, or Firm*—Sundstrand Corporation

[57] ABSTRACT

A hydrostatic seal is provided having control of sealing surface taper and cavitation reduction structure between the sealing surfaces. Control of sealing surfaces taper is provided through one or more relief recesses in the seal wall to which flexing forces are applied by fluid pressure and temperature to reduce the effects of seal rigidity on the parallel relationship between the sealing surfaces. The cavitation reduction structure includes inclination of the channels leading to the sealing surface recesses in the direction of relative movement of the fluid between the sealing surfaces. Enlarged vortex chambers are disposed at the outlet of those channels within the recesses to isolate fluid vapor bubbles from the recess walls.

15 Claims, 4 Drawing Sheets

HYDROSTATIC SEAL

This is a Continuation of U.S. application Ser. No. 08/383,630 type S.N., filed Feb. 6, 1995, now abandoned.

BACKGROUND AND SUMMARY OF THE INVENTION

The present invention relates generally to hydrostatic seals and, more particularly, to the application of hydrostatic seals about a high speed, rotatable shaft in high temperature, high pressure and corrosive fluid environments.

Hydrostatic seals typically involve two or more relatively movable sealing surfaces which are spaced apart in generally parallel relation with a fluid flowing therebetween. That fluid serves to prevent actual contact between the movable, parallel surfaces during seal operation. To the extent the fluid does not achieve that goal, the surfaces can rub together and wear away the parallel configuration toward a tapered configuration, thus degrading seal effectiveness.

As the hydrostatic seal becomes less effective, numerous problems can be created. For example, in addition to fluid leakage, rubbing of the sealing surfaces can cause destruction of related drive components and catastrophic seal failure. Also, localized high temperature can be created which detrimentally affects the fluid composition.

In certain applications, hydrostatic seals are disposed such that one or the other or both of the parallel surfaces is exposed to fluid pressure forces that urge that face out of the parallel relation and would result in a tapered configuration over time. Previously, it has been suggested to use stiffer materials for the seal in order to resist such non-parallel movement or flexing. However, use of stiffer materials can increase seal cost and may be more susceptible to corrosion when certain working fluids are involved. Moreover, at higher pressures flexing still occurs, albeit perhaps at a slower rate. It has also been suggested to actively compensate for flexing forces on the seal by using selectively actuatable counteracting forces. Somewhat along those lines, we are aware of U.S. Pat. No. 4,643,437 which adjusts the sealing surface profile responsive to temperature changes. However, not only can such structures increase the cost of the seal itself, special adaptations to the surrounding housing and related components may be required.

Hydrostatic seals also typically employ open recesses or pockets on one of the parallel faces for accumulation and balanced application of the fluid between those surfaces. Often, relatively narrow channels pass through the seal from a supply of fluid to these recesses. It has been found that fluid entering the recesses from the channels can have a "jet" or venturi effect within the recesses. Where the fluid is functioning at pressures and temperatures which bring it close to a boiling point it is believed that this jetting causes minute vortexes and other conditions within the recess where vapor bubbles are created and then condense back into the fluid. In effect, this is a cavitation within the recesses which can degrade and penetrate through the seal walls defining the recesses, especially in the region opposite the entrance of the channels to the recesses. Ultimately, this effect adversely effects the functioning of the seal and can lead to contact and wear between the parallel surfaces.

To avoid this problem, it may be possible to change fluid conditions such that the boiling point conditions are rarely met, but doing so can adversely affect optimization of the overall operation in which the fluid is used. For example, if the hydrostatic seal is used with a pump in the production of chemicals in fluid solution, it may not be possible to efficiently manufacture those chemicals if the fluid temperature and pressure conditions are altered. It has also been suggested to form the seal from materials that are less sensitive to cavitation and corrosion, but such materials can be significantly more costly and are not always sufficiently rigid to avoid excessive flexing of the parallel surfaces. Further, since the channels are typically the controlling orifice for fluid flow between the parallel surfaces, if the channel configuration is altered to minimize the jetting of fluid into the recess the separation distance of those parallel surfaces can be adversely affected, thus degrading seal operation and effectiveness. In some cases, that can again lead to actual rubbing of the parallel surfaces.

Therefore, it is an objective of this invention to provide an improved hydrostatic seal. Further, specific objectives include the provision of a hydrostatic seal which:

1. resists tapering effects on the parallel sealing surfaces,
2. is relatively inexpensive and readily retrofittable into existing seal applications,
3. controls the effect of flexing forces applied to the parallel sealing surfaces,
4. reduces cavitation effects between the sealing surfaces,
5. has a greater useful life in adverse fluid environments, and
6. can be responsive to both temperature and pressure effects on the seal.

These and other objectives of the present invention are achieved by the provision of a hydrostatic seal having control of sealing surface taper and cavitation reduction structure between the sealing surfaces. Control of sealing surface taper is provided through one or more relief recesses in the seal wall to which flexing forces are applied by fluid pressure and temperature to reduce the effects of seal rigidity on the parallel relationship between the sealing surfaces. The cavitation reduction structure includes inclination of the channels leading to the sealing surface recesses in the direction of relative movement of the fluid between the sealing surfaces. Enlarged vortex chambers are disposed at the outlet of those channels within the recesses to isolate fluid vapor bubbles from the recess walls.

Other objects, advantages and novel features of the present invention will become readily apparent to those skilled in the art from the drawings and detailed description below.

DETAILED DESCRIPTION OF PREFERRED EMBODIMENTS

Figure 1:
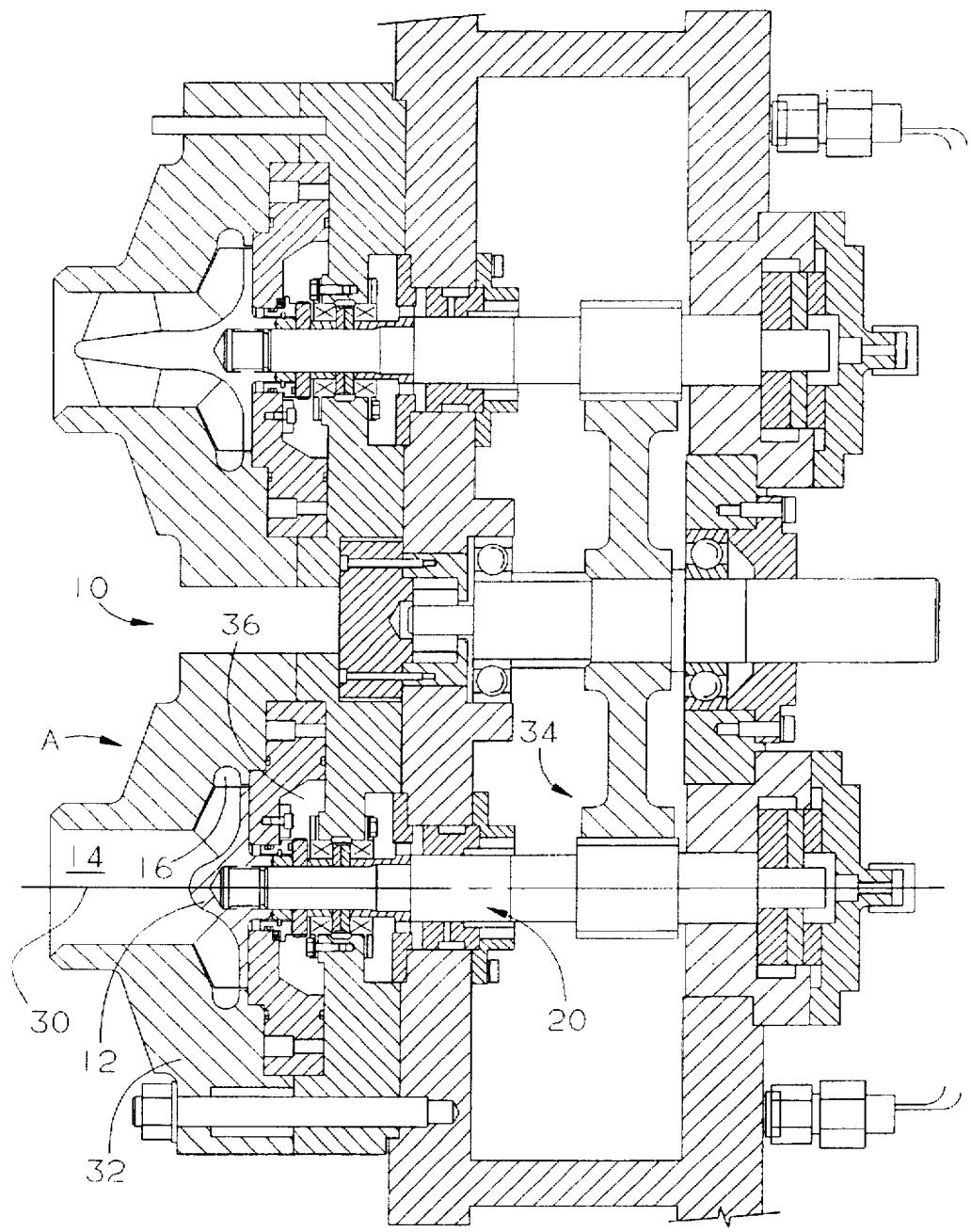
FIG. 1 shows a cross-sectional view of a pump gearbox assembly incorporating the hydrostatic seal of the present invention.

FIG. 1 shows an application of the present invention to a pump apparatus 10 previously marketed by the assignee of the present invention. Retrofitting the improved hydrostatic seal into this apparatus has been found to result in significantly greater pump productivity and reliability at a minimal cost.

Figure 2:
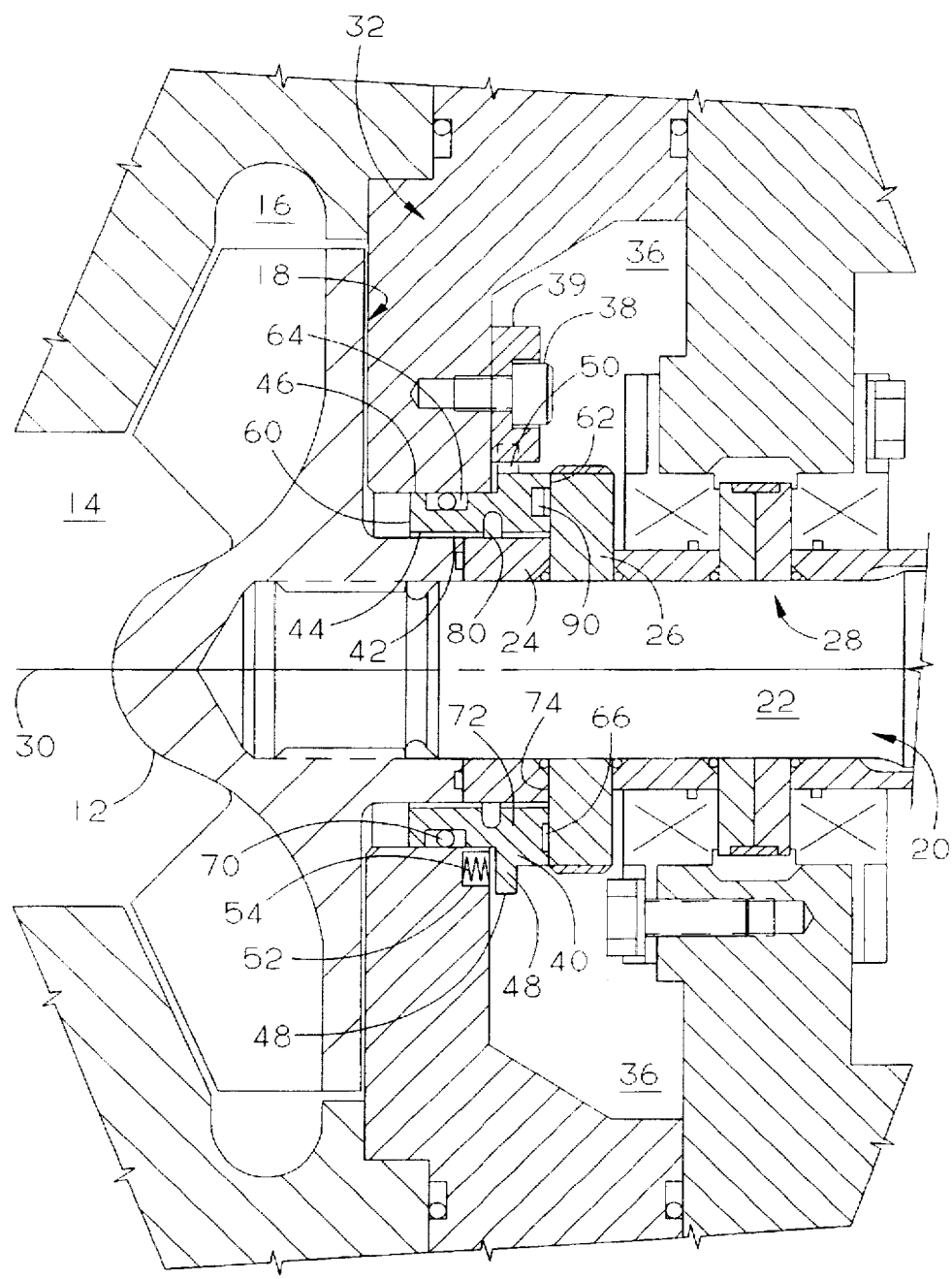
FIG. 2 shows an enlarged cross-sectional view of region A of FIG. 1.

This pump apparatus 10 includes in part a rotatable impeller 12 mounted between fluid channels 14 and 16. In other similar applications impeller 12 can function as a fluid turbine instead of a pump, depending upon the direction of fluid flow between channels 14 and 16. As seen in FIG. 2, impeller 12 is typically immersed in fluid since fluid is permitted to flow in back of the impeller along passageway 18 as well.

Shaft arrangement 20 is connected to impeller 12 and serves to transmit rotational force to or from the impeller. Shaft arrangement 20 includes, for example, core rod 22 which is inserted into impeller 12, clamping sleeve 24 which is mounted about core rod 22 and abuts at one end impeller 12, and a rotating face 26 which is fixed to or integrally formed with core rod 22 and abuts on one side clamping sleeve 24. Shaft arrangement 20 is rotatably mounted about a longitudinal rotational axis 30 within a housing 32 and can also include, for example, other conventional clamping sleeves and face seals 28 to facilitate that mounting. Housing 32 includes apparatus for causing rotation of shaft arrangement 20. In the illustrated example, gear drive 34 is connected near one end of core rod 22 for this purpose.

Seal element 40 is preferably mounted about shaft arrangement 20 over clamping sleeve 24 and a portion of impeller 12. That mounting includes, for example, clearance passageway 42 between inner circumference 44 of seal element 40 and clamping sleeve 24 and impeller 12. In general configuration, seal element 40 is shown as formed in a hollow cylinder having a toroidal cross section about axis 30 between inner circumference 44 and outer circumference 46. Preferably, a radially extending flange 48 is included as well on seal element 40.

Housing 32 is formed with a fluid chamber 36 adjacent rotating face 26 and seal element 40. A flange fastener arrangement is included within chamber 36 to restrict rotation of seal element 40 with respect to housing 32. This fastener arrangement includes, for example, a threaded bolt 38 retaining a washer 39. Flange 48 preferably includes a notched portion 50 which is dimensioned to closely receive washer 39 such that rotation of seal element 40 about axis 30 is prevented.

Housing 32 is also formed with at least one spring chamber 52, each for receiving and retaining a biasing spring 54. Such springs engage flange 48 to urge seal element 40 toward rotating face 26.

Seal element 40 includes several structural features: a pressure receiving surface, end or face 60, a sealing surface, face or end 62, a housing seal notch 64 and fluid recesses, pockets or pads 66 with channels 68 leading from inner circumference 44 to recesses 66. In the embodiment shown, the source of fluid under pressure is channel 16, which is connected to face 60 via passageway 18. An O-ring-type of seal 70 is preferably mounted in notch 64 to restrict fluid flow from passageway 18 to chamber 36 except through passageway 42. Flange 48 is disposed between face 60 and face 62 at, for example, a radial enlargement 72 of sealing element 40.

Face 62 serves as one of the sealing surfaces of the hydrostatic seal. The other sealing surface is end 74 of rotating face 26. Preferably, face 62 and end 74 are generally parallel in a radial direction from axis 30. When shaft arrangement 20 is not rotating, face 62 and end 74 are in contact. When shaft arrangement 20 is rotating fluid flows through channels 68 and into recesses 66. Since recesses 66 are open to end 74 the fluid pressure counteracts the force of springs 54 and separates face 62 from end 74 to permit fluid flow to chamber 36.

In the example shown, pump apparatus 10 can be employed to pump liquid ammonia between temperatures of at least 60°–200° F. and sealed pressures from approximately 500–1000 psi. In doing so, the rotational speed of shaft arrangement 20 is preferably approximately 21,000 rpm. By way of example, passageway 42 would be a gap of approximately 0.030 inch between inner circumference 44 and clamping sleeve 24, and seal element would be formed from type 4140 steel.

It has been found that in such circumstances fluid pressure on sealing element 40 and adjacent structures near the junction of face 62 and end 74 would tend to cause face 62 to move out of parallel relation with end 74. Accordingly, the present invention includes at least one pressure relieving recess 80 formed in inner circumference 44 along passageway 42. For the example above, this recess 80 is preferably a radiussed notch having a width along axis 30 of approximately 0.10 inch and a depth into seal element 40 of approximately 0.15 inch. The location of recess 80 along passageway 42 is preferably immediately upstream of radial enlargement 72. It has been found that inclusion of recess 80 permits control of the pressure and temperature forces which would tend to flex face 62 out of parallel with end 74 and cause tapering. As positioned in the figures, recess 80 has been found to neutralize the flexing by decreasing the effects of seal rigidity.

Recess 80 can be positioned elsewhere in sealing element 40 along passageway 42 if different degrees of flexing are desired in certain applications or if different pressure and temperature conditions are involved. Similarly, the geometry or configuration of recess 80 can be altered to alter the control over flexing, although care should be taken to avoid creation of excessive stress concentrations within seal element 40 (such as by use of radiussed slots or recesses). Also, if greater flexing is desired when the fluid pressure source is channel 16, then recess 80 can be disposed in outer circumference 46 of the seal element. If the source of fluid pressure is chamber 36, then inclusion of recess 80 in the outer circumference is believed to reduce flexing forces on face 62.

Figure 4:
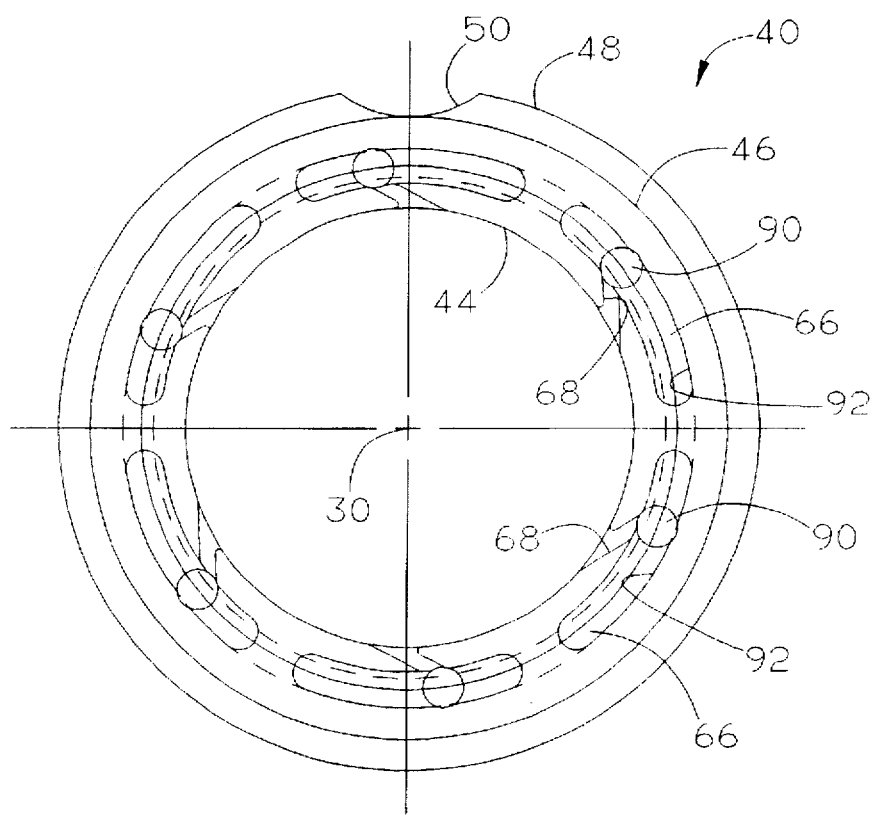
FIG. 4 shows an end view of the hydrostatic seal element taken along line 4—4 of FIG. 3.

Further, since in the detailed example above ammonia tends to be relatively close to its boiling point, cavitation corrosion effects caused by fluid flow through channels 68 into recesses 66 is reduced by inclining channels 68 in the direction of rotation of shaft arrangement 20 about axis 30 (counterclockwise in FIG. 4). This inclination is, for example, of sufficient degree to receive fluid substantially tangentially from clamping sleeve 24. Vortex chambers 90 are formed in recesses 66 to receive fluid from channels 68. Preferably, these vortex chambers are aligned with the opening of channels 68 into recesses 66 such that circular, swirling flow of the fluid is created within chambers 90 and the fluid from channels 68 enters chambers 90 substantially tangentially to that circular flow.

Chambers 90 are, for example, formed to the width of recesses 66, but with a substantially greater depth such that the swirling flow creates a vortex within chamber 90.

This vortex is believed to have a significant centrifugal effect on the fluid such that liquid is expelled from chamber 90 toward walls 92 of recesses 66 while any bubbles entrained in the fluid (such as from fluid vapor momentarily created in minute low pressure zones caused by fluid flow into recesses 66) are retained within the central portion of chamber 90 until the bubbles condense back to liquid.

Figure 3:
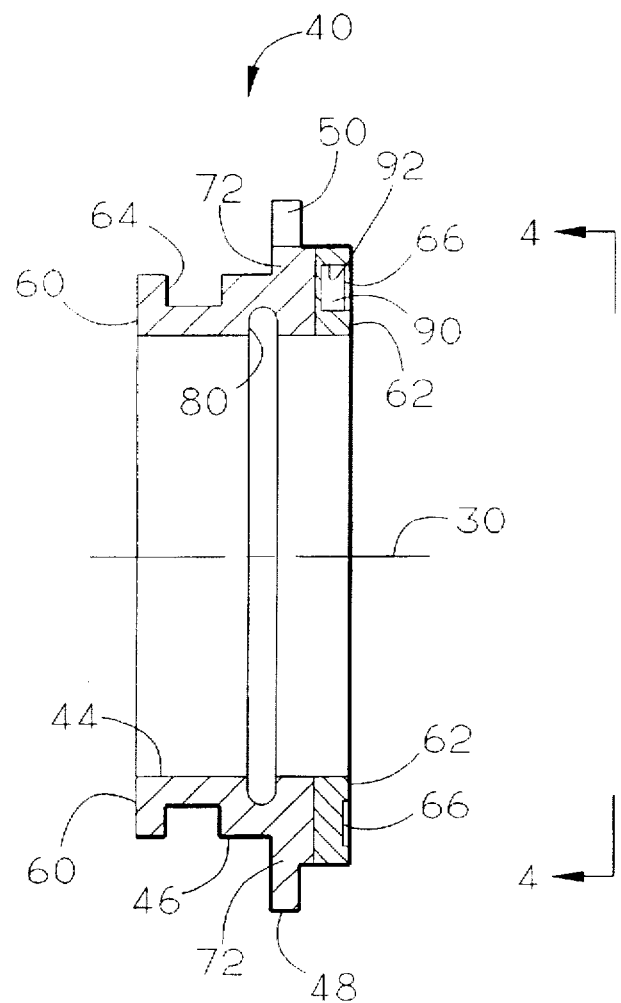
FIG. 3 shows a further enlarged cross-sectional view of the hydrostatic seal element of FIG. 1 with an alternative cladding composition.

Thus, the creation of bubbles by cavitation is reduced and those bubbles which do arise are restricted from impingement on walls 92. As a further precaution, in certain embodiments recesses 66 of face 62 can be formed from less corrosive material, such as Stellite 12, either by cladding to seal element 40 (as shown in FIG. 3) or by integral construction (as shown in FIG. 2).

Those skilled in the art will recognize that although the present invention has been described above in detail with respect to a specific embodiment, other embodiments are possible within the scope of the invention as it is described in the appended claims. It is therefore understood that the spirit and scope of the appended claims are not limited to the specific embodiments described and depicted herein.

What we claim is:

1. A fluid seal arrangement between two parts, one of which is rotatable relative to the other, comprising:

a rotationally fixed and axially movable first part, said first part including a first face surface;

a second part mounted for rotation adjacent said first part, said second part being axially fixed and including a second face surface adjacent said first face surface, said first and second face surfaces defining a junction therebetween;

a source of fluid under pressure provided adjacent said first part said source and said second part having a clearance passage therebetween, said clearance passage being configured and disposed so as to supply said fluid to said junction of said first and second face surfaces; and means, within said first part and in communication with said clearance passage, to control pressure forces on said first face surface which would tend to cause at least a portion of said first face surface to converge or diverge from said second face surface as a result of application of said fluid to said junction, said means to control said pressure forces including a relief recess on a pressure receiving wall within said clearance passage, said relief recess being isolated from said junction.

2. The fluid seal arrangement according to claim 1 wherein said pressure relief recess is configured to relieve stress concentration within said pressure receiving wall.

3. A fluid seal arrangement between two parts, one of which is rotatable relative to the other, comprising:

a first part;

a second part mounted for rotation adjacent said first part;

a source of fluid under pressure;

said fluid source and said second part having a clearance passage therebetween such that fluid from said source can flow therebetween;

said first part including a first face surface;

said second part including a second face surface adjacent said first face surface;

said clearance passage being configured and disposed so as to supply said fluid to the junction of said first and second face surfaces; and means, within said clearance passage, to control the pressure forces on said first face surface which would tend to cause at least a portion of said first face surface to converge or diverge from said second face surface as a result of application of said fluid to said junction;

wherein at least one of said first and second face surfaces includes at least one recess therein for receiving said fluid from said junction, at least one fluid channel means for permitting fluid flow from said junction to said recess, and means, within said recess, for isolating bubbles in said fluid from the walls of said recess.

4. The fluid seal arrangement according to claim 3 wherein said channel means is inclined in the direction of rotation of said second part and said means for isolating bubbles includes an enlarged chamber within said recess for receiving fluid from said channel means in a manner that centrifugally confines said bubbles within said chamber until said bubbles condense into said fluid.

5. A pump for providing motive force to a fluid, comprising:

a rotatable impeller immersed in said fluid;

a shaft, rotatable about a longitudinal axis, for driving said impeller;

a housing for receiving said shaft;

a hydrostatic seal means mounted about said shaft and rotationally fixed with respect to said housing for restricting the flow of said fluid into said housing, said seal means including an end face;

an axially fixed rotating face mounted about said shaft adjacent to and opposing said end face;

a source of fluid pressure applied to said end face in a direction generally radial with respect to said longitudinal axis; and means disposed on a fluid contacting surface of said seal means for control of said radially directed fluid pressure on said end face, said seal means and said shaft being formed with a clearance portion therebetween at least adjacent said end face for receiving fluid from said fluid pressure source said fluid contacting surface being disposed within said clearance portion, said means for control including a fluid receiving recess extending into said seal means from said clearance portion, said fluid receiving recess being isolated from said end face.

6. The pump according to claim 5 wherein said end face and said rotating face are initially disposed in substantially parallel relation and said fluid pressure applied to said end face would tend to move said end face out of said parallel relation absent said means for control.

7. A pump for providing motive force to a fluid, comprising:

a rotatable impeller immersed in said fluid;

a shaft, rotatable about a longitudinal axis, for driving said impeller;

a housing for receiving said shaft;

a hydrostatic seal means mounted about said shaft and fixed with respect to said housing for restricting the flow of said fluid into said housing;

said seal means including an end face;

a rotating face mounted about said face adjacent to and opposing said end face;

a source of fluid pressure applied to said end face in a direction generally radial with respect to said longitudinal axis; and means, disposed on a fluid contacting surface of said seal means for control of said radially directed fluid pressure on said end face, said fluid pressure controlling seal misalignment, said seal means and said shaft being formed with a clearance portion therebetween at least adjacent said end face for receiving fluid, said fluid contacting surface being disposed within said clearance portion, said means for control including a fluid receiving recess extending into said seal means from said clearance portion;

said end face including at least one fluid receiving pocket within its surface which is open to and facing said rotating face, at least one fluid channel between said source of fluid pressure and said pocket for supplying fluid to said pocket, and means within said pocket for limiting contact between fluid vapor bubbles and the radially outer walls of said pocket.

8. The pump according to claim 7 wherein said means for limiting contact includes an enlarged chamber within said pocket and means for creating circular fluid flow within said chamber to isolate at least a portion of any fluid vapor bubbles arising in said pocket, by centrifugal forces within said chamber, from proximity to said radially outer walls.

9. The pump according to claim 8 wherein said means for creating circular fluid flow includes inclination of said channel in the direction of rotation of said rotating face and disposition of said chamber to the opening of said channel into said pocket such that fluid enters said chamber substantially tangentially to the direction of said circular fluid flow.

10. A hydrostatic seal arrangement in a fluid pump having a rotatable impeller immersed within a fluid, a generally cylindrical shaft connected to said impeller for driving said impeller about a rotational axis, a housing for receiving said shaft and containing at least in part a drive means for causing rotation of said shaft, a hydrostatic seal means mounted with clearance about a portion of said shaft and fixed with respect to said housing for restricting the flow of high pressure fluid to or from said housing, said seal means including an end face extending generally radially with respect to said rotational axis, a rotational face mounted to said shaft adjacent, opposing and generally parallel to said end face, a source of fluid under pressure, said end face including a plurality of recesses therein for receiving said fluid under pressure and channel means connecting each of said recesses to said source of fluid under pressure, said end face also including therein:

means for isolating fluid cavitation effects from structural elements of said recesses; and said means for isolating being mounted within said recesses.

11. The hydrostatic seal arrangement according to claim 10 wherein said means for isolating includes a chamber formed within each of said recesses for creating a fluid vortex to contain fluid vapor bubbles.

12. The hydrostatic seal arrangement according to claim 11 wherein said source of fluid under pressure includes said impeller and supplies fluid to said end face through said clearance between said seal means and said shaft, said channel means include passageways from said shaft to said recesses, those passageways being inclined in the direction of rotation of said shaft about said rotational axis, and said chamber includes a generally cylindrical depression of substantially greater depth than other portions of the recess within which it is located.

13. The hydrostatic seal arrangement according to claim 12 including control means, mounted in said seal means, for adjusting the responsiveness of said end face to fluid pressure forces tending to move said end face and said rotational face out of parallel relation or into contact with each other during rotation of said shaft.

14. The hydrostatic seal arrangement according to claim 12 including means, disposed within said clearance between said seal means and said shaft, for reducing forces applied to said end face which would tend to move said end face out of parallel relation with said rotational face, that means for reducing including a pressure relieving recess formed in said seal means and in fluid communication with said clearance.

15. The hydrostatic seal according to claim 14 wherein said seal means is generally formed as a hollow cylinder having a flange extending radially outward therefrom intermediate its longitudinal length, said housing including a locating fastener, said flange being dimensioned and configured so as to be received by said locating fastener, said seal means includes a pressure receiving face in communication with said source of fluid pressure and oppositely disposed from said end face, and said pressure relieving recess is disposed along said longitudinal length between said pressure receiving face and said a flange.

* * * * *